(12) United States Patent
Kulesha

(10) Patent No.: US 7,954,763 B2
(45) Date of Patent: Jun. 7, 2011

(54) METHODS AND SYSTEMS FOR COMPOSITE STRUCTURAL TRUSS

(75) Inventor: Richard L. Kulesha, Bear, DE (US)

(73) Assignee: The Boeing Company, Chicago, IL (US)

( * ) Notice: Subject to any disclaimer, the term of this patent is extended or adjusted under 35 U.S.C. 154(b) by 568 days.

(21) Appl. No.: 11/696,793

(22) Filed: Apr. 5, 2007

(65) Prior Publication Data

US 2008/0245927 A1    Oct. 9, 2008

(51) Int. Cl.
*B64C 1/00* (2006.01)
(52) U.S. Cl. ................................. 244/123.1; 244/123
(58) Field of Classification Search ............... 244/123.1
See application file for complete search history.

(56) References Cited

U.S. PATENT DOCUMENTS

| | | | |
|---|---|---|---|
| 582,527 A | 5/1897 | Golden | |
| 1,429,600 A * | 9/1922 | Lundin | 244/123.8 |
| 2,233,969 A | 3/1941 | Woods | |
| 2,589,193 A | 3/1952 | Mayne | |
| 3,901,465 A | 8/1975 | DeAngelis | |
| 3,973,766 A * | 8/1976 | Heath | 269/43 |
| 4,051,289 A * | 9/1977 | Adamson | 428/113 |
| 4,078,352 A | 3/1978 | Knowles | |
| 4,120,065 A | 10/1978 | Sivachenko et al. | |
| 4,223,053 A * | 9/1980 | Brogan | 428/34.5 |
| 4,481,703 A | 11/1984 | Scott | |
| 4,671,470 A * | 6/1987 | Jonas | 244/119 |
| 5,332,178 A | 7/1994 | Williams | |
| 5,499,782 A * | 3/1996 | Domine | 244/1 A |
| 5,499,904 A * | 3/1996 | Wallace et al. | 416/230 |
| 5,632,940 A | 5/1997 | Whatley | |
| 5,993,941 A * | 11/1999 | Vasiliev et al. | 428/178 |
| 6,427,945 B1 * | 8/2002 | Bansemir | 244/129.1 |
| 6,502,788 B2 * | 1/2003 | Noda et al. | 244/123.3 |
| 6,561,459 B2 * | 5/2003 | Amaoka et al. | 244/123.7 |
| 6,638,466 B1 * | 10/2003 | Abbott | 264/238 |
| 6,655,633 B1 * | 12/2003 | Chapman, Jr. | 244/123.9 |
| 6,889,937 B2 * | 5/2005 | Simpson et al. | 244/123.1 |
| 6,945,727 B2 * | 9/2005 | Christman et al. | 403/109.8 |
| 7,575,194 B2 * | 8/2009 | Brown et al. | 244/123.1 |
| 2003/0173460 A1 * | 9/2003 | Chapman, Jr. | 244/123 |
| 2004/0079838 A1 * | 4/2004 | Simpson et al. | 244/123 |
| 2004/0191441 A1 * | 9/2004 | Bureau et al. | 428/34.6 |

(Continued)

OTHER PUBLICATIONS

International Search Report and Written Opinion of PCT/US2008/058796; Jan. 7, 2009; 14 pages.

(Continued)

*Primary Examiner* — Tien Dinh
*Assistant Examiner* — Justin Benedik
(74) *Attorney, Agent, or Firm* — Armstrong Teasdale LLP

(57) ABSTRACT

Methods and structures for a composite truss structure are provided. The structure includes an upper chord member, a lower chord member, and a plurality of web members extending therebetween. Each of the upper chord member, the lower chord member, and the plurality of web members are formed of a continuous composite fiber positioned in each of the upper chord member, the lower chord member, and each of the plurality of web members wherein each of the upper chord member, the lower chord member, and the plurality of web members includes a predetermined number of passes of the continuous composite fiber corresponding to a predetermined load. The composite truss structure also includes at least a first gusseting plate coupled to the upper chord member, the lower chord member, and the plurality of web members.

11 Claims, 4 Drawing Sheets

U.S. PATENT DOCUMENTS

| | | | |
|---|---|---|---|
| 2005/0115186 A1* | 6/2005 | Jensen et al. | 52/633 |
| 2006/0032702 A1 | 2/2006 | Linsmeier et al. | |
| 2006/0042181 A1* | 3/2006 | Foo et al. | 52/633 |
| 2006/0145031 A1* | 7/2006 | Ishikawa et al. | 244/219 |

OTHER PUBLICATIONS

Vasiliev, V.V. et al.; Anisogrid Composite Lattice Structures for Spacecraft and Aircraft Applications; Composite Structures; 2006; pp. 182-189; vol. 76.

Vasiliev, V.V. et al.; Filament-Wound Anisogrid Lattice Shear Beams for Airframe Structures; Proceedings of the International Symposium of Manufacturing Technology for Composite Aircraft; Jan. 1, 2004; pp. 1-4.

MIRA Flies High Using Composite Wing Ribs; SAE-UK.org Winter 2006 Issue; 3 pages.

Black, S.; Composite Rib Structure for Airbus A380 Vertical Tail; Mar. 2004; 4 pages.

Halme, J.; Development Testing of a Composite Wing Rib; Abstract of the Master's Thesis; May 6, 2002; Helsinki University of Technology; 134 pages.

* cited by examiner

METHODS AND SYSTEMS FOR COMPOSITE STRUCTURAL TRUSS

BACKGROUND

Embodiments of the disclosure relate generally to methods and structures for forming lightweight truss members and more particularly, to methods and structures for forming composite wing rib and fuselage truss members.

Conventional aircraft wing construction generally comprises one or more spars that extend laterally relative to the longitudinal axis of the fuselage to support a plurality of longitudinally extending laterally spaced ribs that define the shape of the air foil. Vertical web portions of the ribs include structural elements configured to carry compressive and tensile loads to maintain the airfoil shape. A truss design for aircraft wing ribs is an efficient method of transferring and distributing loads throughout the wing structure. Additionally truss structures are used for bridges, floors and other supporting structures. At least some known truss structures are heavy due to the use of metal components and structural elements of the truss structure. A lightweight material may be used to make strong lightweight truss structures however, current composite ribs are complicated to manufacture and generally heavy in order to provide sufficient load transfer between the truss structural elements. The assembly of aircraft wings utilizing composite ribs in the wing have also proven to be difficult.

What are needed are methods and structures for providing lightweight support structures that facilitate fabrication of the truss structures and connecting components and reduce assembly time.

SUMMARY

In one embodiment, a composite truss structure includes an upper chord member, a lower chord member, and a plurality of web members extending there between. Each of the upper chord member, the lower chord member, and the plurality of web members are formed of a continuous composite fiber positioned in each of the upper chord member, the lower chord member, and each of the plurality of web members wherein each of the upper chord member, the lower chord member, and the plurality of web members includes a predetermined number of passes of the continuous composite fiber corresponding to a predetermined load. The composite truss structure also includes at least a first gusseting plate coupled to the upper chord member, the lower chord member, and the plurality of web members.

In another embodiment, a method of forming a composite structural member includes forming a profile of the structural member wherein the profile includes a channel representing interconnected structural elements, winding a continuous fiber through the channel a predetermined number of passes through each structural element based on a strength requirement of each respective structural element, and coupling at least one gusseting plate to the interconnected structural elements.

In yet another embodiment, a method of forming an aircraft wing including a composite wing rib includes forming a wing rib including a plurality of interconnected structural elements using a continuous epoxy impregnated fiber positioned a predetermined number of passes in each structural element wherein the number of passes is based on a strength requirement of each respective structural element. The method also includes coupling a gusseting plate to a side of the interconnected structural elements, assembling at least one wing rib to a forward spar and an aft spar, assembling a trailing edge skin to the spar and wing rib assembly, assembling an upper and a lower center skin to the rib, spar and trailing edge skin assembly such that the center skins overlap the trailing edge skin, and attaching the leading edge skin to the wing assembly such that the leading edge skin overlaps the center skin and trailing edge skin assembly.

DETAILED DESCRIPTION

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure.

Figure 1:
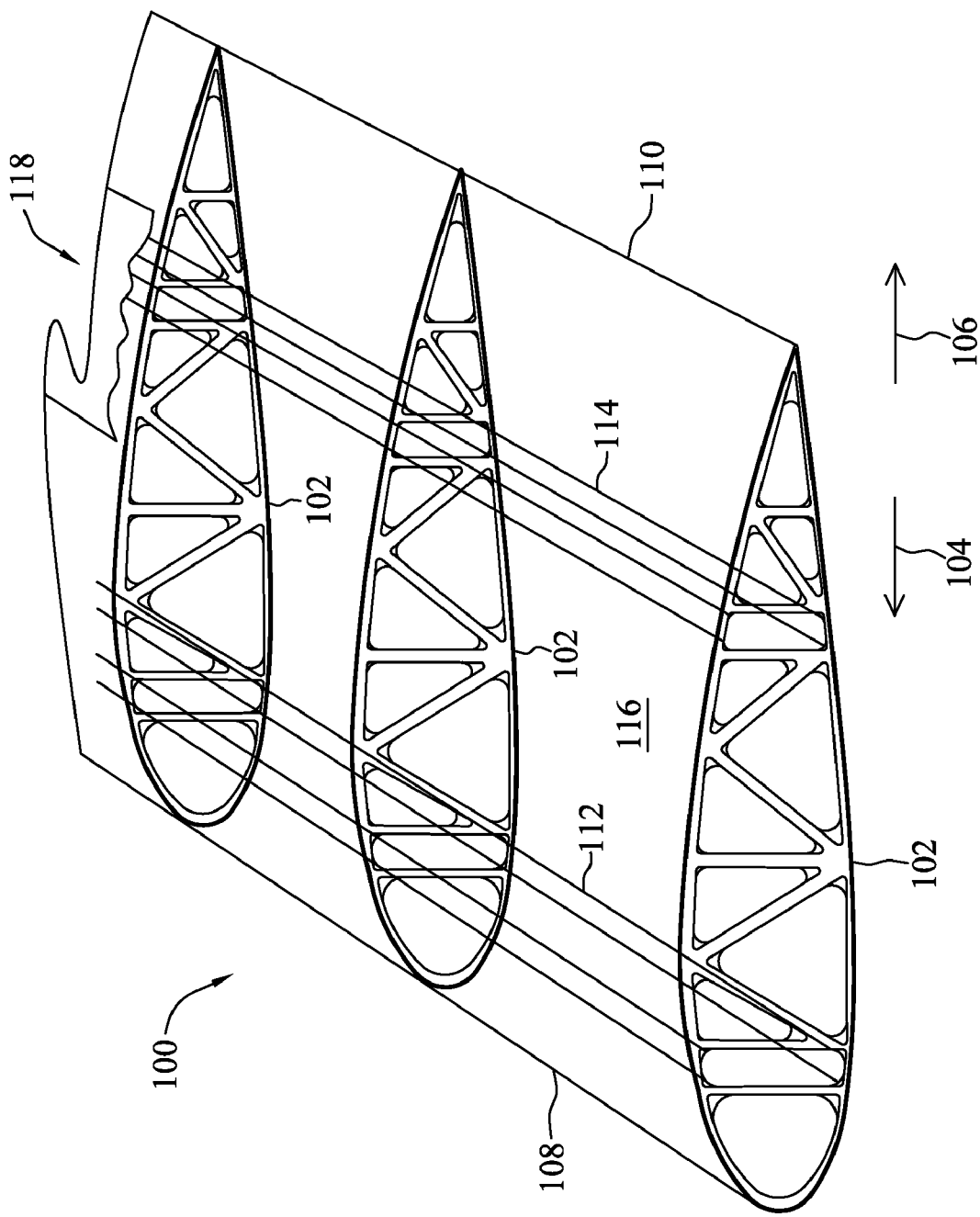
FIG. 1 is a cut-away isometric view of an aircraft wing structure in accordance with an embodiment of the disclosure.

FIG. 1 is a cut-away isometric view of an aircraft wing structure 100 in accordance with an embodiment of the disclosure. In the exemplary embodiment, aircraft wing structure 100 includes a plurality of truss rib assemblies 102 extending in a forward direction 104 and an aft direction 106 between a leading edge 108 and a trailing edge 110 of aircraft wing structure 100. Aircraft wing structure 100 also includes a forward wing spar 112 and an aft wing spar 114 extending from a fuselage of the aircraft (not shown). A lower wing skin 116 is joined to lower portions of truss rib assemblies 102 between leading edge 108 and trailing edge 110. Similarly, an upper wing skin 118 is bonded to upper portions of truss ribs 102 between leading edge 108 and trailing edge 110.

Figure 2:
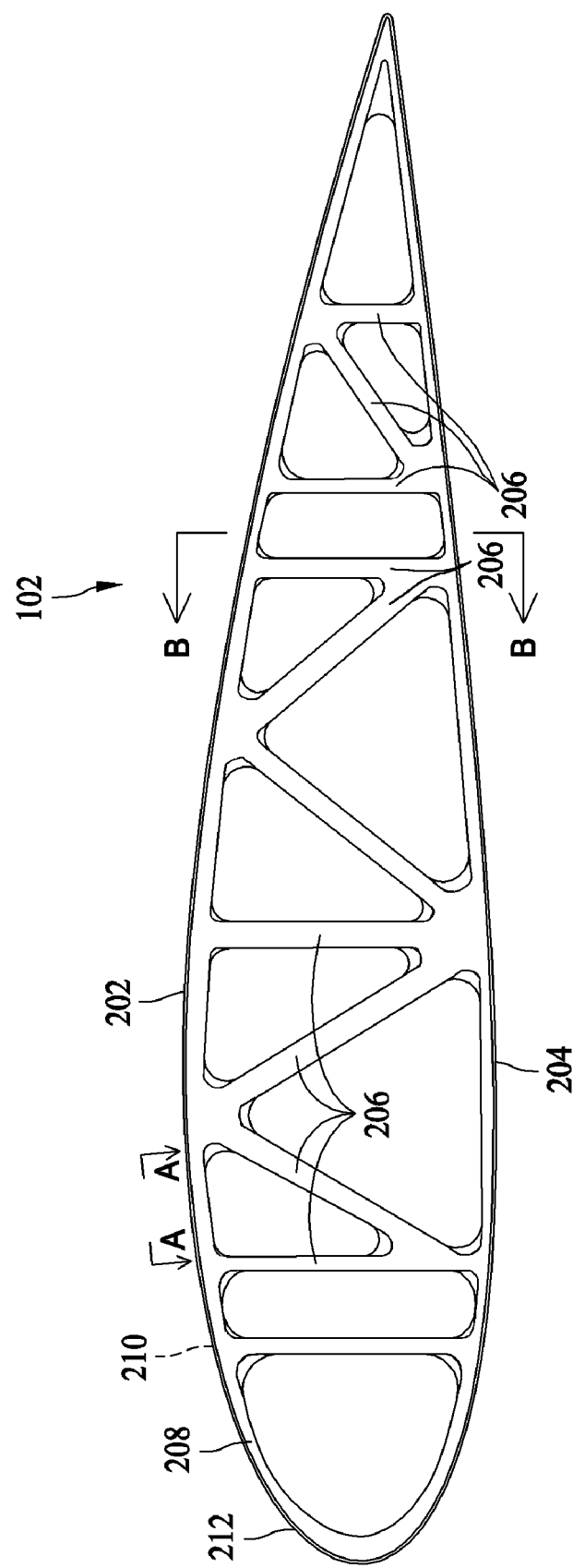
FIG. 2 is a side cross-sectional view of a truss rib assembly in accordance with an exemplary embodiment of the disclosure.

FIG. 2 is a side cross-sectional view of a truss rib assembly 102 in accordance with an exemplary embodiment of the disclosure. Although described as a rib for an aircraft airfoil such as a wing, it should be understood that the structures and methods of fabricating such structures may be used for other composite truss structures, for example, but not limited to joists, roof trusses, and bridge deck support members. In the exemplary embodiment, truss rib assembly 102 comprises a composite truss structure. Truss rib assembly 102 includes an upper chord member 202, a lower chord member, 204, and a plurality of web members 206 extending therebetween. Each of upper chord member 202, lower chord member, 204, and web members 206 are formed of a continuous composite fiber wound through each of upper chord member 202, lower chord member 204, and web members 206. A number of passes or turns of the continuous composite fiber that are channeled through each member is determined based on a strength requirement of each member and based on the strength capability of each continuous composite fiber and the strength capability of the determined number of continuous composite fibers channeled through each member. The continuous composite fiber may comprise, but is not limited to a carbon fiber, a fiber glass fiber, an aromatic polyamide fiber such as Aramid, other fiber filaments or combinations thereof. The continuous composite fiber may also comprise, but is not limited to, a tow, or a web comprising the above materials. The fiber, web or tow may be impregnated with an adhesive, a thermoplastic or a thermoset.

In the exemplary embodiment, upper chord member 202 and lower chord member 204 are joined at leading edge 108 and trialing edge 110. In an alternative embodiment, upper chord member 202, lower chord member 204 are not joined directly and may be joined through web member 206 extending between upper chord member 202 spaced apart from lower chord member 204.

Truss rib assembly 102 also includes a first rib side or gusseting plate 208 coupled to upper chord member 202, lower chord member 204, and web members 206, and a second rib side or gusseting plate 210 (not visible on the backside of truss rib 102 in FIG. 2) coupled to a side of upper chord member 202, lower chord member, 204, and web members 206 opposite from first gusseting plate 208. First gusseting plate 208 and second gusseting plate 210 sandwich upper chord member 202, lower chord member 204, and web members 206 therebetween. First gusseting plate 208 and second gusseting plate 210 may also include a flange 212 extending away from an outer peripheral edge 214 of the respective gusseting plate 208 and 210. Flange 212 increase a stiffness of truss rib assembly 102 and provides a coupling location for attaching lower wing skin 116 and upper wing skin 118 (both shown in FIG. 1). After gusseting plates 208 and 210 are attached to truss rib assembly 102, gusseting plates 208 and 210 are routed or machined to open up the webs of gusseting plates 208 and 210 to conform a profile of gusseting plates 208 and 210 to a profile of upper chord member 202, lower chord member 204, and web members 206 and to reduce the weight of truss rib assembly 102.

During fabrication, a form in a predetermined shape of truss rib assembly 102 is formed using a channeled frame. A continuous fiber generally of a composite material such as carbon filament is wound through the channel a predetermined number of passes through each structural element based on a strength requirement of each respective structural element. The continuous fiber may include, but is not limited to fibers, filaments, webs, and tapes including carbon or other material. The fibers, filaments, webs, and tapes may also be impregnated with an adhesive, thermoplastic, or thermoset such as for example an epoxy. The fiber is wound through the channels representing the various structural elements forming truss rib assembly 102. More passes of the fiber through a structural elements generally permits that structural element to withstand greater load. The load carrying requirement of each structural element is determined and this requirement is associated with a number of turns or passes to achieve that load carrying capability.

One or both of gusseting plates 208 and 210 are coupled to a side of truss rib assembly 102 to provide additional stiffness and an attachment means for, for example, a skin of the airfoil or deck of a bridge.

As described above, truss rib assembly 102 is a composite rib that is fiber placed with side plates co-bonded, bonded or consolidated, if thermoplastic, to the side of the rib. A continuous fiber is placed down following and outlining the rib mold line and the truss structural members. This process is continued until the rib is of sufficient thickness to carry the appropriate wing design loads. The fiber placement of the ribs allows each rib to be tailored optimizing the structural design and reducing the weight of the wing assembly. The side plates are then added, one to each side of the rib to act as gussets at the junction of each of the truss structural elements. After the side plates are attached to the center rib structure the side plates are machined to open up the side plate webs and reduce the weight. Truss rib assembly 102 is illustrated as if manufactured as a complete truss rib assembly 102 but the option exists to manufacture truss rib assembly 102 in more than one piece to facilitate different wing assembly methods. The flanges shown at the spar and cap locations are to bond the rib and or rib sections to the individual skins to form skin assemblies and then bond the subassemblies into a completed wing. The use of the composite truss ribs are not limited to aircraft wings, but also to floor or roof trusses on buildings, and bridge trusses that are manufactured in different locations and are erected on site. The light weight truss simplifies handling with less or smaller support equipment.

Figure 3:
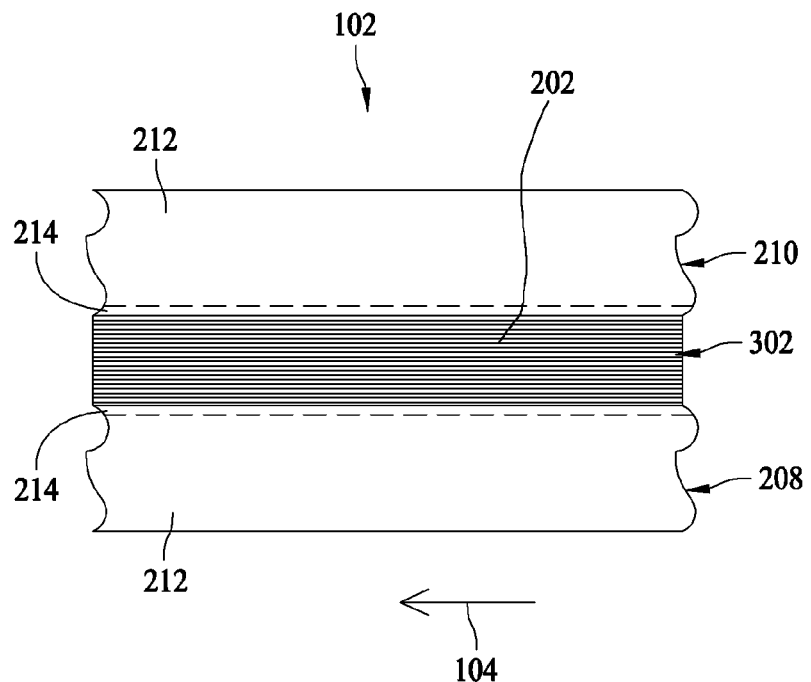
FIG. 3 is a section view of the truss rib assembly shown in FIG. 2 taken along section lines A-A.

FIG. 3 is a section view of truss rib assembly 102 taken along section lines A-A (shown in FIG. 2). In the exemplary embodiment, truss rib assembly 102 is formed by a plurality of passes or turns of a continuous fiber 302 wound about a form or frame to the shape of the desired truss rib assembly 102. The passes of fiber are substantially unidirectional and are adhered or bonded together to form a rigid truss comprising upper chord 202, of which only a portion is shown in FIG. 3.

Figure 4:
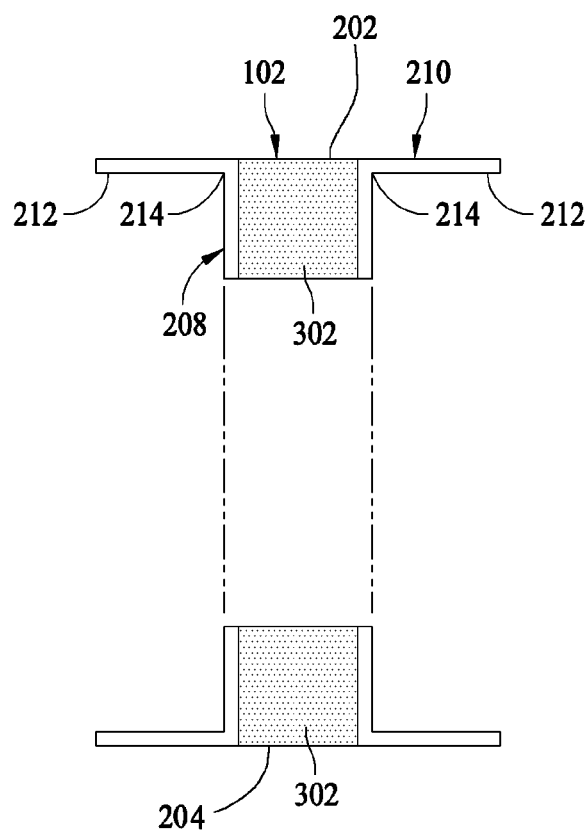
FIG. 4 is a section view of the truss rib assembly shown in FIG. 2 taken along section lines B-B.

FIG. 4 is a section view of truss rib assembly 102 taken along section lines B-B (shown in FIG. 2). In the exemplary embodiment, truss rib assembly 102 is formed by a plurality of passes or turns of a continuous fiber 302 wound about a form or frame to the shape of the desired truss rib assembly 102. The passes of fiber are substantially unidirectional and are adhered or bonded together to form a rigid truss comprising upper chord 202 and lower chord 204, of which only a portion of each is shown in FIG. 4.

Figure 5:
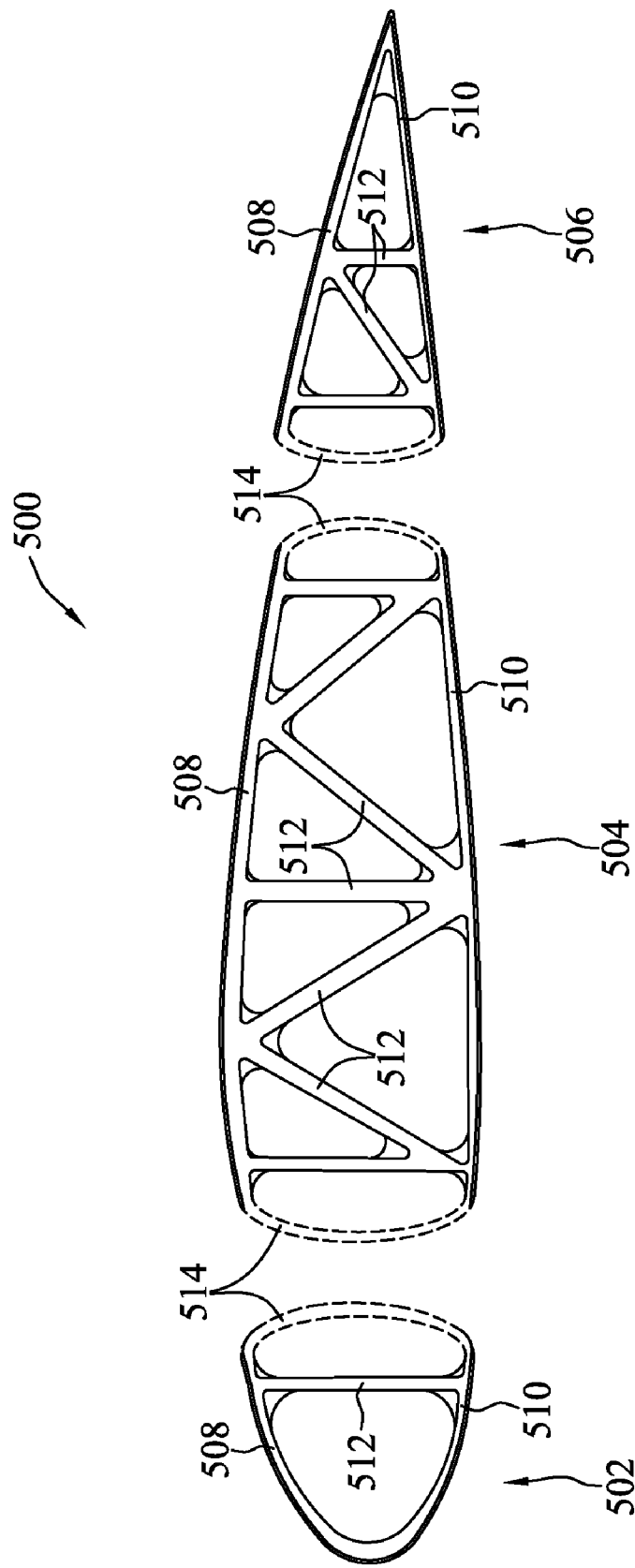
FIG. 5 is a side cross-sectional view of a truss rib assembly 500 in accordance with another exemplary embodiment of the disclosure.

FIG. 5 is a side cross-sectional view of a truss rib assembly 500 in accordance with another exemplary embodiment of the disclosure. In the exemplary embodiment, truss rib assembly 500 is fabricated in three portions, a forward portion 502, a center portion 504, and an aft portion 506. Each portion is formed of a continuous fiber wound in channels oriented in a pattern representing a respective portion of an upper chord 508, a lower chord 510, and interconnecting structural members 512 forming the truss web. Each portion includes at least one fabrication channel 514 coupled to a distal end of respective portions of upper chord 508 and lower chord 510. Fabrication channel 514 permits winding a continuous fiber through all members of forward portion 502, a center portion 504, and an aft portion 506 during fabrication. Fabrication channel 514 is removed from forward portion 502, a center portion 504, and an aft portion 506 after formation of forward portion 502, a center portion 504, and an aft portion 506 is complete and further assembly is accomplished by joining forward portion 502, a center portion 504, and an aft portion 506. In one embodiment, forward portion 502 and center portion 504 are assembled to a forward spar (not shown) prior to being joined to each other and center portion 504 and an aft portion 506 are assembled to a rear spar (not shown) prior to being joined to each other.

The above-described methods of forming composite structural members and composite truss structures formed thereby are cost-effective and highly reliable. The methods and structures include a continuous fiber wound through a plurality of structural elements to form the member. The fiber is placed such that it is substantially unidirectional along a longitudinal axis in each of the elements to provide lightweight compressive and tensile strength to the member. Accordingly, the methods and structures facilitate reducing weight and fabrication time, and improving strength and stiffness of the structural member in a cost-effective and reliable manner.

While embodiments of the disclosure have been described in terms of various specific embodiments, those skilled in the art will recognize that the embodiments of the disclosure can be practiced with modification within the spirit and scope of the claims.

What is claimed is:

1. A composite truss structure comprising:
   a center rib structure comprising:
      an upper chord member;
      a lower chord member; and
      a plurality of web members extending therebetween, said upper chord member, said lower chord member, and said plurality of web members all unitarily formed using at least one continuous composite fiber wound and positioned to form each of said upper chord member, said lower chord member, and each of said plurality of web members, each of said upper chord member, said lower chord member, and said plurality of web members each formed from a predetermined number of passes of said at least one continuous composite fiber, the number of passes through each said member corresponding to a predetermined load for that said member; and
   at least a first gusseting plate having substantially the same profile as said center rib structure members and coupled to a side of said center rib structure.

2. A structure in accordance with claim 1 further comprising a second gusseting plate having substantially the same profile as said center rib structure members and coupled to a side of said center rib structure opposite from said first gusseting plate wherein said first gusseting plate and said second gusseting plate sandwich said center rib structure therebetween.

3. A structure in accordance with claim 2 wherein a profile of at least one of said plates is complementary to a profile of said upper chord member, said lower chord member, and said plurality of web members.

4. A structure in accordance with claim 1 wherein said at least a first gusseting plate comprises a flange extending away from an edge of the respective gusseting plate.

5. A structure in accordance with claim 1 wherein the number of passes of fiber through each member is determined based on a load to be applied to said member.

6. A structure in accordance with claim 1 wherein the number of passes of fiber through a member determines a load bearing capability of the member.

7. A structure in accordance with claim 1 wherein said at least a first gusseting plate is machined to conform to a profile of the center rib structure.

8. A structure in accordance with claim 1 wherein said plurality of web members comprise at least one of a vertical web member, a horizontal web member, and a diagonal web member.

9. A structure in accordance with claim 1 wherein said upper chord member, said lower chord member, and said plurality of web members comprises at least one of an epoxy impregnated carbon filament, an epoxy impregnated carbon tow, and an epoxy impregnated carbon web.

10. A structure in accordance with claim 1 wherein a first end of said upper chord member is coupled to a first end of said lower chord member and a second end of said upper chord member is coupled to a second end of said lower chord member.

11. A structure in accordance with claim 1 wherein a first portion of said center rib structure is formed separately from a second portion of said center rib structure, the first and second portions coupled to each other to form said center rib structure.

* * * * *